United States Patent [19]

Hunt

[11] 3,871,402

[45] Mar. 18, 1975

[54] AUTOMATIC TRANSMISSION FLUID CONTROL APPARATUS

[76] Inventor: William G. Hunt, P.O. Box 545, Laurinburg, N.C. 28352

[22] Filed: Jan. 8, 1974

[21] Appl. No.: 431,742

Related U.S. Application Data

[63] Continuation-in-part of Ser. No. 344,041, March 22, 1973, abandoned.

[52] U.S. Cl............................ 137/383, 137/630.21
[51] Int. Cl................................. F16k 35/00
[58] Field of Search..................... 137/383, 383.4, 137/630.19-630.22, 624.27, 459

[56] References Cited
UNITED STATES PATENTS 1,174,061  3/1916  Fite et al....................... 137/630.21

*Primary Examiner*—Henry T. Klinksiek
*Attorney, Agent, or Firm*—Parrott, Bell, Seltzer, Park & Gibson

[57] ABSTRACT

Theft of an automotive motor vehicle is precluded by an anti-theft device inserted into an automatic transmission fluid line. The anti-theft device has a plurality of ported members mounted on a common shaft and rotatable to predetermined positions to align the ports and form a fluid passageway and a blocking member which is operatively connected to the ported members and arranged to move into the passageway upon cessation of fluid flow therethrough. Operation of the blocking member and the ported members is coordinated so that the blocking member is removed from the passageway as the ported members are moved into the aligned positions.

14 Claims, 12 Drawing Figures

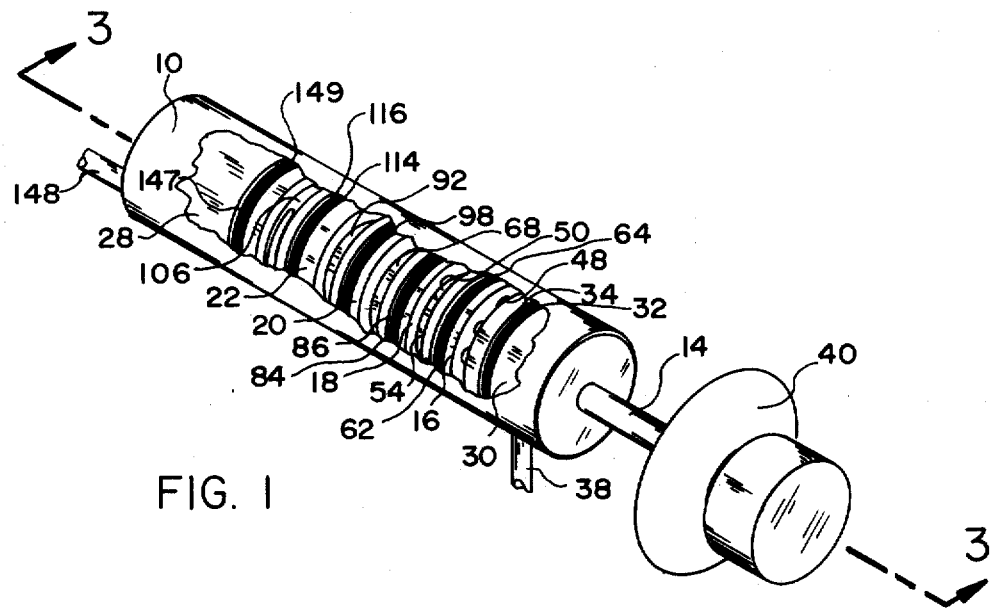
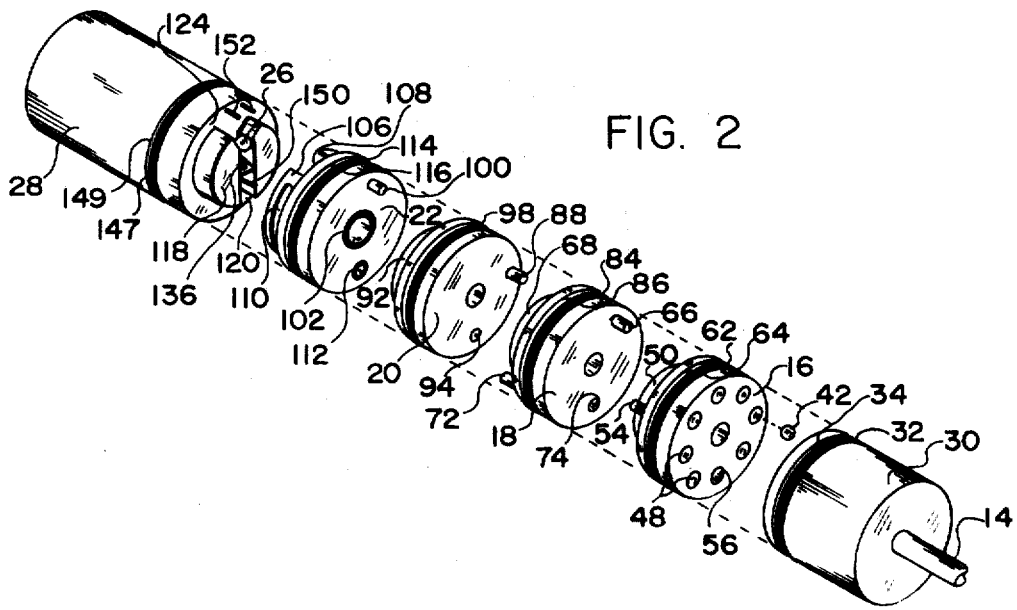

AUTOMATIC TRANSMISSION FLUID CONTROL APPARATUS

This application is a continuation-in-part of copending application Ser. No. 344,041, filed Mar. 22, 1973, entitled "Fluid Control Apparatus" and now abandoned.

The theft of automotive motor vehicles has long presented a problem and various proposals have been made heretofore to preclude such thefts. While only certain of the proposals made have been successfully adopted, proposed arrangements have included alarm systems which respond to changes in the electrical system of the motor vehicle; electrical interlocks which lock ignition systems open; steering wheel locks for interfering with directional control over a vehicle; and arrangements for preventing delivery of fuel to a carburetor of an engine or the like.

Not withstanding such proposals, theft of automotive motor vehicles continues at a relatively high rate. In part, such rates of theft reflect a high percentage of automobiles which were unlocked or had an ignition key in the vehicle, permitting a thief to bypass electrical system and steering wheel devices. Further, many electrical theft prevention devices can either be readily removed or overcome by wiring a circuit around the device. Fuel blocking controls of the type which have been proposed may be relatively readily bypassed by providing an auxiliary source of fuel sufficient to remove the vehicle from the scene of the theft.

Having in mind the difficulties and deficiencies of prior arrangements, it is an object of the present invention to preclude theft of an automotive motor vehicle by preventing transmission of driving power from the engine to the driving wheels. In accomplishing this object of the present invention, the difficulties and deficiencies of prior anti-theft arrangements are overcome in that even the presence of a key in an ignition switch will not permit theft of the automotive vehicle. In particular, a thief would not be able to move an automobile even though the driving engine could be started and any steering wheel lock released.

Yet a further object of the present invention is to permit normal operation of an automotive vehicle by the owner or other authorized persons while assuring that such operation cannot occur after operation of the transmission for the automobile has been interrupted. In realizing this object of the present invention, the anti-theft device of the present invention responds to a cessation of fluid flow which is indicative of an interruption in the operation of the drive train of the automotive motor vehicle. Normal operation is restored only upon a particular manipulation of the device of this invention, in a manner which would be known to the vehicle owner or an authorized operator but would be unknown to a thief or other unauthorized operator.

Some of the objects of the invention having been stated, other objects will appear as the description proceeds, when taken in connection with the accompanying drawings, in which:

FIG. 1 is a perspective view, partly broken away, of a device in accordance with this invention;

FIG. 2 is an exploded perspective view of portions of the device of FIG. 1;

Figure 3:
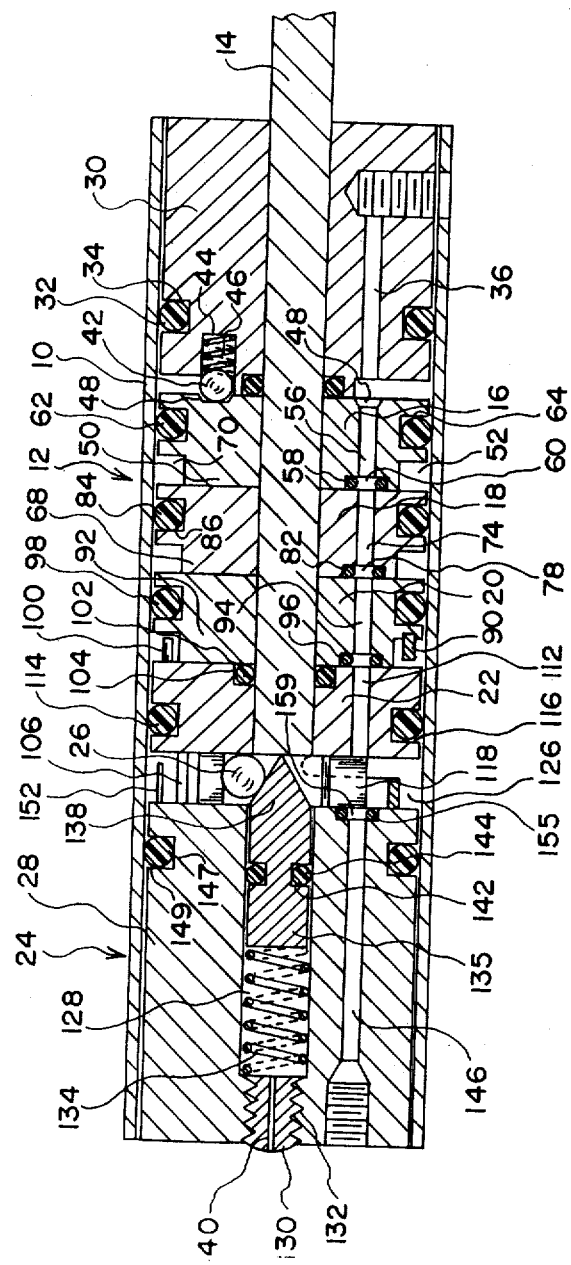
FIG. 3 is a section view of the device of FIG. 1, taken generally along the line 3—3 in that figure.
Figure 4:
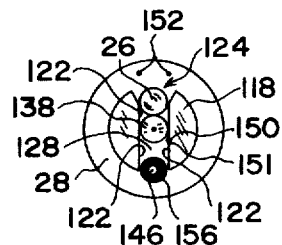
FIG. 4 is an end view of a first form of one poriton of the device of FIGS. 1-3, shown in a first open position.
Figure 5:
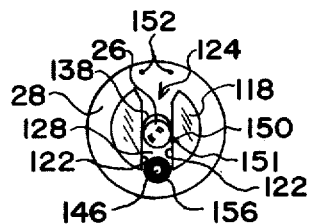
FIG. 5 is a view similar to FIG. 4, illustrating a second open position.
Figure 6:
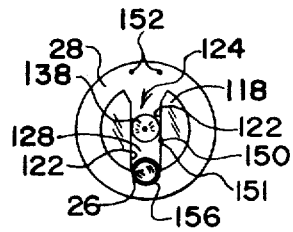
FIG. 6 is a view similar to FIGS. 4 and 5, illustrating a blocking position.
Figure 7:
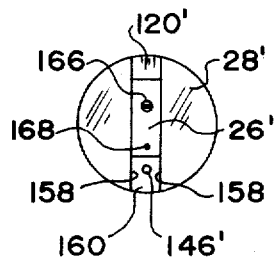
FIG. 7 is a view similar to FIG. 4 of a second form of a portion of the device of FIGS. 1-3.
Figure 8:
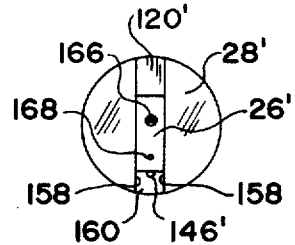
FIG. 8 is a view similar to FIG. 5 of the arrangement of FIG. 7.
Figure 9:
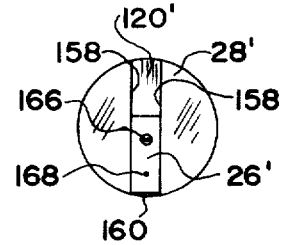
FIG. 9 is a view similar to FIG. 6 of the arrangement of FIG. 7.
Figure 10:
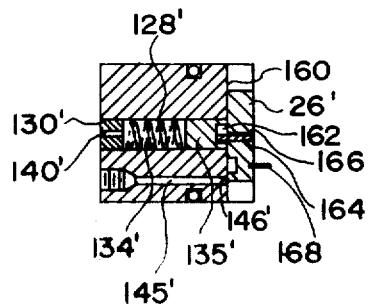
FIG. 10 is an elevation view in section, of the arrangement of FIGS. 7-9.
Figure 11:
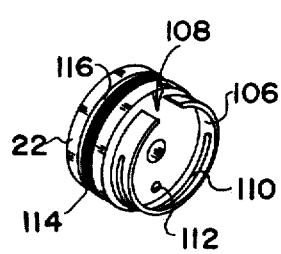
FIG. 11 is a perspective view of a first form of release member.
Figure 12:
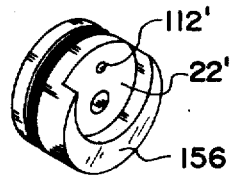
FIG. 12 is a perspective view of a second form of release member.

While arrangements in accordance with this invention will be described hereinafter with particular reference to the accompanying drawings, which show the best form of the present invention contemplated at the time this application is filed, it is to be recognized at the outset that broad utility is contemplated for the devices of this invention. Accordingly, the description and drawings are to be taken as illustrative rather than limiting on the present invention. It is believed that knowledgeable persons, having learned of the arrangement of this invention from the description and drawings, will be able to modify the structure and uses of this invention in various ways while remaining within the broad scope of utility originally contemplated for this invention.

Before referring more specifically to the accompanying drawings, it is believed desirable to generally review the device of this invention and its intended cooperation with an automotive motor vehicle. Briefly, the device of this invention comprises a gating means including a plurality of ported members which are alignable in predetermined positions to define a passageway. The gating means is operatively connected to a blocking member which is arranged to move into blocking position within the passageway upon cessation of fluid flow therethrough and is movable out of the blocking position by movement of the ported members which comprise the gating means. The term "cessation" is used herein as intended to encompass sudden decrease in fluid flow as well as complete stoppage.

When the present apparatus is used as an anti-theft device in motor vehicles, it is installed within an automatic transmission fluid line. Since the device should preferably be located in a position which is inaccessible to an unathorized user within a reasonable period of time, an especially suitable location on motor vehicles is within the transmission housing with means being located within the operator's compartment for remotely positioning the movable members of the gating means.

When the present apparatus is in operative position, the movable members are aligned so that the ports therein define a passageway and the blocking member is held in a first position spaced from the passageway. When operation of the motor vehicle is begun, fluid flows through the passageway and fluid pressure causes the blocking member to move from the first open position to a second open position, also spaced from the passageway.

Upon cessation of fluid flow through the passageway, i.e., when operation of the motor vehicle ceases, the blocking member moves from the second open position to a third or blocking position within the passageway, thus preventing subsequent fluid flow.

The blocking member is connected to the movable members in such a manner that movement of the movable members removes the blocking member from the third or blocking position and returns it to the first open position. Movement of the movable members from their open predetermined positions to their closed positions, however, disaligns the ports within the members and destroys the passageway. In order to reform the passageway, the movable members must be returned to their open or predetermined positions, which can only be accomplished by the owner or an authorized person having knowledge of the predetermined positions.

The gating means is preferably of the combination type described generally in previously granted patents, such as Fite et al, U.S. Pat. No. 1,174,061, and comprises a plurality of ported tumblers positioned on a rotatable shaft within a cylindrical housing. The ports which extend through the tumblers are spaced equidistant from the shaft and are alignable upon alternate clockwise and counterclockwise rotation of the shaft to move the tumblers to predetermined positions.

The blocking member, carried by a base member, is also preferably located within the cylindrical housing and adjacent to the last tumbler comprising the gating means and is carried by the last tumbler from the blocking position to the aforesaid first open position.

A preferred embodiment of the invention, shown in FIGS. 1–3, is comprised of gating means and fluid obstructing means mounted within a cylindrical housing 10. The gating means 12 is comprised of a rotatable shaft 14 carrying in sequence a first or drive tumbler 16, driven second and third tumblers 18 and 20, and a fourth or release tumbler 22. The fluid obstructing means 24 is comprised of a blocking member 26 carried by a base or end member 28.

The gating means 12 is separated form the exterior of housing 10 by a first end member 30 which is fixedly mounted within a first end of the cylindrical housing 10 and rotatably receives the shaft 14 therethrough. An air of liquid impermeable seal is achieved between the first end member 30 and the housing 10 with an O-ring 32 held within a groove 34 extending about the periphery of the member 30. A first fluid port 36 extends through the member 30 and is adapted for connection to a fluid inlet line 38 at the exterior face of the member 30.

A positioning means 40, shown in the drawings as a dial, is affixed to the free end of the shaft 14. Other positioning means, such as a motor movable in increments upon receiving electrical impulses from a remote source, may also be used.

The first or drive tumbler 16 is rigidly mounted on the shaft 14 adjacent to the rear face of the end member 30 so as to rotate with respect to the member 30.

To prevent the possibility of an unauthorized user determining the predetermined positions of the movable members by listening to the sound of the tumblers or feeling their movement as they are moved, a means is provided for producing audible clicks by way of pressure spots as the first tumbler 16 is rotated relative to the base or end member 28. Said means comprises a bearing 42 held within a recess 44 on the rear face of the first end member 30 and urged outwardly by a spring 46 also within the recess 44. The outer face of the first tumbler 16 contains a plurality of depressions 48 equally spaced from the shaft 14 at a distance equal to the spacing of the recess 44 from the shaft 14. Upon rotation of the first tumbler 16 relative to the first end member 30, the bearing 42 moves from one to another of the depressions 48, producing an audible click.

The rear face of the first tumbler 16 contains a centrally positioned spacer or boss 50 having an annular space 52 thereabout. A contact pin 54 for transmitting rotary motion from the first tumbler 16 to the remaining tumblers of the gating means is also positioned on the rear face of the tumbler 16 and extends rearwardly into the annular space 52. A second fluid port 56 extends through the first tumbler 16 and boss 50 and is spaced from the shaft 14 for alignment with the first fluid port 36. An O-ring 58 is held within a recess 60 surrounding the second fluid port 56 on the rear face of the tumbler 16.

Frictional contact between the tumbler 16 and the interior of the cylindrical housing 10 is accomplished by an O-ring 62 which is held within a groove 64 extending about the periphery of the tumbler 16.

The driven second tumbler 18 is positioned snugly within housing 10, rotatably mounted on the shaft 14 and positioned to ride against the boss 50 on the drive tumbler 16. The front face of the second tumbler 18 has mounted thereon a contact pin 66 positioned to be contacted by the contact pin 54 on the first tumbler 16.

Extending rearwardly from the rear face of the second tumbler 18 is a centrally positioned boss 68 having an annular space 70 thereabout and a pin 72 extending from the rear face of the tumbler 18 into the annular space 70. A third fluid port 74 extends through the tumbler 18 and boss 68 and is positioned for alignment with the fluid port 56 in the first tumbler 16 to form a passageway sealed by the O-ring 58 on the first tumbler 16. The rear face of the second tumbler 18 contains a groove 78 about the port 74 which holds an O-ring 82. A second O-ring 84 is positioned within a groove 86 about the periphery of the tumbler 18 to promote frictional contact between the tumbler 18 and the interior of the housing 10.

A third tumbler 20, which is also a driven tumbler, first snugly within the cylindrical housing 10 and is rotatably mounted on shaft 14 and positioned to ride against the boss 68 on the second tumbler 18. The third tumbler 20 is structurally identical to the second tumbler 18, with pins 88 and 90 corresponding to pins 66 and 72; boss 92 corresponding to boss 68; fourth fluid port 94 corresponding to third fluid port 74; and O-rings 96 and 98 corresponding to O-rings 82 and 84, respectively. Of course, the pins 88 and 90 may be located in different positions from the pins 66 and 72, if desired. The fourth fluid port 94 is positioned for alignment with the third fluid port 74 to form a passageway sealed by the O-ring 82 on the second tumbler 18.

A fourth or release tumbler 22 fitting snugly within the housing 10 is rotatably mounted on the shaft 14 and positioned to ride against the boss 92 on the third tumbler 20. The front face of the release tumbler 22 carries a contact pin 100 positioned for contact by the contact pin 90 on the third tumbler 20 and an O-ring 102 positioned within groove 104 about shaft 14 to provide an air impermeable seal between the fourth tumbler 22 and the shaft 14.

An annular retaining wall 106 projects rearwardly from the rear face of the tumbler 22 and includes a notch 108, having a width greater than the diameter of the blocking member hereinafter described, and a fluid communication opening 110 in the wall thereof. The diameter of the annular wall 106 is slightly less than that of the tumbler 22 for reasons to be hereinafter explained. A fifth fluid port 112 extends through the tumbler 22 and is positioned for alignment with the fourth fluid port 94 in the third tumbler 20 to form a passageway sealed by the O-ring 94 on the tumbler 20. An O-ring 114 is positioned about the tumbler 22 in a peripheral groove 116 to promote frictional contact between the tumbler 22 and the housing 10.

The base or end member 28 of the fluid obstructing means 24 is rigidly positioned within the housing 10 adjacent the gating means 12 and is axially aligned therewith. The front face of the end member 28, i.e., the face adjacent the rear face of the release tumbler 22 has a central, generally circular boss 118 integral with said face and extending forwardly therefrom. A channel 120 in the boss 118 if defined by walls 122 which diverge at one end thereof to form an entranceway 124 extending perpendicular to the axis of the fluid control apparatus and across the diameter of the boss 118. The boss 118 has a diameter less than the diameter of the member 28 in order to form an annular recess 126 around the boss 118 for receiving the annular wall 106.

A passageway 128 extends axially through the end member 28 with the front end opening between the walls 122 which form the channel 120 and the rear end thereof being threaded. A set screw or retainer 130 is received within the threaded rear end 132 of the passageway 128 and a coil spring 134 is inserted immediately in front thereof. A reciprocal piston 136 having a tapered front end 138 is inserted in the front end of the passageway 128 and rests against the spring 134 which normally urges the piston 136 forwardly into the channel 120 between the walls 122. The retainer 130 may be adjusted within the passageway 128 against the rear end of the spring 134 to adjust the compressive forces thereof. The retainer 130 contains an air outlet 140 extending therethrough from the interior of the passageway 128 to the exterior of the housing 10 to provide communication therebetween, so that air is not compressed within the passageway 128 during the reciprocal action of the piston 136. A peripheral groove 142 about the piston 136 carries an O-ring 144 providing an air and fluid seal between the piston 136 and the wall of the passageway 128.

The end member 28 further contains a sixth fluid port 146 positioned at the end of the groove 116 opposite the entranceway 124 and extending through the member 28 to communicate with the fluid outlet line 148.

A resilient restraining member 150 is positioned within a groove 151 in the wall 122 and extends outwardly into the channel 120 at a point between the piston 136 and the port 146 to restrain the blocking member 26 to be hereinafter described.

A stop or pair of stops 152 are positioned on the face of the end member 28 in the annular recess 126 at a point aligned with the entranceway 124. The distance between the stop 152 and the adjacent end of the walls 12 is sufficient to permit the blocking member 26 to pass therebetween.

Riding freely within the channel 120 is a blocking member 26 adapted to be restrained by the piston 136 while in the first open or inoperative position and by the restraining member 150 while in the second open or set position. When in the third or blocking position, the blocking member 26 is adapted for positioning between ports 112 and 146.

An O-ring 147 is located about the end member 28 in groove 149 and another O-ring fits within a groove 155 about the port 146 to insure air tight seals.

In describing the operation of the preferred embodiment, the time when the gating means is set in the open position and a fluid is injected into the apparatus through the fluid inlet line 38 has been arbitrarily selected as the starting point.

At such time, a fluid injected under pressure into the inlet line 38 flows progressively through the aligned ports 36, 56, 74, 94, 112 and 146 and out through the fluid outlet line 148. A portion of the fluid also flows into the space between the gating means 12 and the fluid obstructing means 24, forcing the piston 136 into the passageway 128 and compressing the spring 134 against the spring retainer 130. As the piston 136 is forced into the passageway 128, the tapered end 138 is removed from the channel 120 and the blocking member 26 previously held thereby moves downwardly into contact with the resilient restraining member 150 and is supported thereby.

Upon cessation of fluid flow through the apparatus, the tapered end 138 of the piston 136 is urged forwardly into the channel 120 by spring 134. As this occurs, the tapered end 138 bears against the upper surface of the blocking member 26, forcing it past the resilient restraining member 150 and into a position between the fluid ports 112 and 146 and supported from below by the annular wall 106, thus preventing further fluid flow through the apparatus.

In order to remove the blocking member 26 from between the ports 112 and 146, the drive tumbler 16 is rotated by turning the shaft 14 through the dial 40. As the tumbler 16 rotates, the pin 54 positioned on the rear face thereof contacts the pin 66 on the front face of the second tumbler 18 causing it to rotate. Rotation of the tumbler 18 brings the pin 72 on the rear face thereof into contact with the pin 88 on the front face of the third tumbler 20, thus causing that tumbler 20 to rotate. Rotation of the third tumbler 20 in turn results in the pin 90 on the rear face thereof contacting the pin 100 on the front face of the fourth or release tumbler 22, causing it to rotate.

As the release tumbler 22 is rotated, the notch 108 in the wall 100 is brought to a position below the blocking member 26, whereupon that member drops into the notch 108 and into contact with the housing 10.

Upon further rotation of the release tumbler 22, the blocking member 26 is carried around the annular recess 126 until it contacts the stop 152, whereby it is impelled through the entranceway 124 into the channel 120 and drops against the tapered end 138 of the piston 136, which is in the forward position. The pins on the tumblers are so positioned that rotation of a tumbler to bring a pin carried thereby into contact with a pin on an adjacent tumbler results in the fluid ports in said tumblers becoming disaligned or closed. In order to bring the fluid ports in the tumblers into alignment or open position to form a passageway, the shaft 14 is alternately rotated in clockwise and counterclockwise directions according to a combination known to the owner and authorized users to bring tumblers into predetermined positions, whereupon the ports in the tumblers are aligned to form a passageway again permitting fluid flow through the apparatus.

ALTERNATIVE EMBODIMENT

In an alternative embodiment of the above apparatus, as shown in FIGS. 7–10 and 12, the release tumbler 22 is replaced by an alternative release tumbler 22' which includes a cam wall 156 on the rear face thereof which is eccentric to the axis of the shaft 14. The cam wall 156 is formed by cutting an eccentric recess into the rear face in such a manner that the fluid port 112' is on the side of the shaft 14 opposite the side where the cam wall 156 is furtherest from the periphery of the tumbler 22'.

The second end member 28 is replaced by an alternative second end member 28' which includes a front face having a diametrical channel 120' therein. Channel 120' is formed by a pair of parallel walls 158 and a base 160 cut into the surface of the front face of the member 28'. A passageway 128' extends through the end member 28' and includes a retainer plug 130' and a spring 134' similar to those of the preferred embodiment. Within the passageway is a piston 135' which includes a recess 162 in the front end thereof adjacent the channel 120'. The piston 135' is resiliently urged into the channel 120' by the spring 134', which is restrained by the retainer plug 130'. The plug 130' is vented through the air outlet 140' to the exterior of the housing 10 in the same manner and for the same purpose as earlier described.

A slideable blocking member 26' having a cross sectional dimension approximately the same as the channel 120' is positioned within the channel 120' for reciprocal movement therein. A spring loaded, tubular pin 164 extends rearwardly from a recess 166 in the blocking member 26' into communication with the piston 135'. The opening through the pin 164 permits fluid to flow from the chamber formed between the second end member 28' and the release tumbler 22' through the opening and into communication with the piston 135'.

The front surface of the blocking member 26' has mounted thereon a bearing pin 168 positioned in the path of the cam wall 156 as it is rotated.

A port 146' (corresponding to the port 146) extends through the member 28' and is alignable with the port 112' on the release tumbler 22'.

When the apparatus is in the operative position, the blocking member 26' is held in a first open position above the ports 112' and 146' by the pin 164 in the recess 166 in the piston 135'. As fluid passed through the apparatus, the piston 135' is forced into a retracted position in the passageway 128' by fluid pressure. The pin 164, freed from the recess 166, moves downwardly into contact with the wall of the passageway 128' thereby moving the blocking member 26' to a second open position, still located above the ports 112' and 146'.

Upon cessation of fluid flow, the piston 136' is returned to its normal position by the spring 134'. This forces the pin 164 out of the passageway 128' and into the recess 166 in the blocking member 26'. As the blocking member 26' is no longer supported by the pin 164, it drops downwardly into blocking position between the ports 112' and 146'.

In order to remove the blocking member 26' from between the ports 112' and 146', the release tumbler 22' is rotated in the manner hereinbefore described. As the tumbler 22' rotates, the bearing pin 168 engages the cam wall 156 forcing the blocking member 26' to travel upwardly in the channel 120' until the pin 164 is opposite the recess 166 in the piston 135', whereupon the pin is urged into the recess 166, thus repositioning the blocking member 26' with the pin 164 inserted in the recess 166 of the piston 136' in a cocked or ready position.

The tumblers 16, 18, 20 and 22' are then moved to their predetermined positions in the manner previously described to form a passageway for subsequent fluid flow and, as the flow begins, the piston 136' retracts to its operative position with the pin 164 resting against the wall of the passageway 128'.

In the drawings and specification, there has been set forth a preferred embodiment of the invention, and although specific terms are employed, they are used in a generic and descriptive sense only and not for purposes of limitation.

That which is claimed is:

1. A device for preventing unauthorized operation of a motive power transmission which uses pressurized fluid flowing in a line, the device comprising:
    a gating means having an open position and a closed position, said gating means having a fluid passageway therethrough when in said open position;
    a fluid obstructing means associated with said gating means and having a blocking position obstructing the flow of fluid through said passageway and a non-blocking position permitting flow of fluid through said passageway, and
    means for moving said fluid obstructing means from said non-blocking position to said blocking position responsive to the cessation of fluid flow through said line.

2. The apparatus of claim 1 wherein said gating means is comprised of a plurality of movable members having ports therein defining said passageway when said gating means is in said open position.

3. The apparatus according to claim 1 and further including means for moving said gating means from said open position to said closed position for disrupting said passageway responsive to movement of said fluid obstructing means from said blocking position to said non-blocking position.

4. The apparatus of claim 1 wherein said gating means is a combination valve having a plurality of ported tumblers rotatable to predetermined positions to define said passageway.

5. The apparatus of claim 1 wherein said fluid obstructing means is comprised of a base member having a port therein aligned with said passageway and a blocking member carried by said base member movable between a blocking position between said port and said passageway and a non-blocking position.

6. The apparatus of claim 5, wherein said base member includes means for moving said blocking member between a first open, a second open and a closed position, movement of said blocking member from said first open position to said second open position being responsive to commencement of fluid flow through said passageway, movement of said blocking member from said second open position to said closed position being responsive to cessation of fluid flow through said passageway, and movement of said blocking member from said closed position to said first open position being responsive to movement of said gating means from said open position to said closed position.

7. The apparauts of claim 6 wherein said base member includes a channel therein intersecting said port, said blocking member being carried in said channel while in said first and second open positions and said closed position.

8. The apparatus of claim 7, wherein said obstructing means further includes a plunger carried by said base member and normally urged toward said channel into a position supporting said blocking member when in said first open position, said plunger being retractable from said supporting position upon commencement of fluid flow.

9. The apparatus of claim 8, wherein said plunger has a tapered end normally urged into said channel and engaging said blocking member in said first open position.

10. The apparatus of claim 8 wherein said plunger has a recess in the end adjacent said channnel and said blocking member contains a stop pin adapted for insertion within said recess when said blocking member is in said first open position.

11. An anti-theft device adapted for insertion within an automatic transmission fluid line of a motor vehicle comprising a gating means having a plurality of ported members movable between an open position and a closed postion, the ports in said members defining a fluid passageway when said members are in said open position;

a fluid obstructing means including a blocking member movable between a blocking position and a non-blocking position, said blocking position preventing flow of a fluid through said passageway, means associated with said blocking member for moving the blocking member from said non-blocking position to said blocking position responsive to the cessation of fluid flow through said fluid line;

a housing enclosing said gating means and said blocking member; and means for moving said gating means from said open position to said closed position.

12. The apparatus of claim 11, wherein said gating means includes a first connector means for connecting a fluid inlet line to said passageway and said fluid obstructing means includes a second connector means for attaching a fluid outlet line for communication with said passageway.

13. An anti-theft device insertable within an automatic transmission fluid line of a motor vehicle comprising a housing having a cylindrical opening therethrough;

a combination valve mounted in said housing and comprising a plurality of ported tumblers rotatable to predetermined positions to define a passageway through said housing, said valve having a front face and a rear face;

a rotatable shaft extending through said valve and outwardly from said front face, said tumblers being rotatably mounted on said shaft;

means for rotating said shaft in clockwise and counterclockwise directions;

a base member positioned within said cylindrical housing adjacent said rear face of said combination valve, said base member having a blind port therethrough aligned with said passageway when said tumblers are in said predetermined positions; and a blocking member carried by said base member, said base member including means for urging said blocking member into blocking position between said fluid port and said passageway responsive to the cessation of fluid flow through said passageway and out of said blocking position responsive to rotation of said shaft to move said tumblers from said predetermined positions.

14. The apparatus of claim 13, wherein said base member includes a channel therein extending perpendicular to and into communication with said port, said blocking member being received in said channel.

* * * * *